No. 774,735. PATENTED NOV. 15, 1904.
A. BOGUSLAVSKY.
WHEEL FOR VEHICLES.
APPLICATION FILED FEB. 29, 1904.
NO MODEL. 3 SHEETS—SHEET 1.

WITNESSES: INVENTOR:
Fred White Alexander Boguslavsky,
René Muire By his Attorneys
Arthur C. Fraser & Co.

No. 774,735. PATENTED NOV. 15, 1904.
A. BOGUSLAVSKY.
WHEEL FOR VEHICLES.
APPLICATION FILED FEB. 29, 1904.
NO MODEL. 3 SHEETS—SHEET 3.

WITNESSES:
Fred White
René Muine

INVENTOR:
Alexander Boguslavsky,
By his Attorneys:
Arthur C. Fraser & Co.

No. 774,735.

Patented November 15, 1904.

UNITED STATES PATENT OFFICE.

ALEXANDER BOGUSLAVSKY, OF LONDON, ENGLAND.

WHEEL FOR VEHICLES.

SPECIFICATION forming part of Letters Patent No. 774,735, dated November 15, 1904.

Application filed February 29, 1904. Serial No. 195,897. (No model.)

*To all whom it may concern:*

Be it known that I, ALEXANDER BOGUSLAVSKY, manufacturer, a subject of the Emperor of Russia, residing in London, England, have invented certain new and useful Improvements in and Relating to Wheels for Vehicles, of which the following is a specification.

This invention relates to wheels; and its object is to provide a wheel with a resilient tire which will be as efficient as or more so than any tire hitherto in use and less liable to get out of order.

A wheel made in accordance with my invention is provided with a rim having a circumferential slot, chamber, or groove formed therein, or it may be a series of radial slots, grooves, or compartments. Sliding staves, battens, fellies, tire, or tires are disposed in the chambers, slots, or grooves and project beyond the rim in one direction—that is, away from the hub. A resilient cushion or cushions is or are disposed in the groove, grooves, or chambers between the sliding staves, battens, fellies, and tire and the back of the rim. A cover or covers, of india-rubber or other material, are or may be disposed over the battens, staves, or fellies and between the battens and rim.

Figure 1:
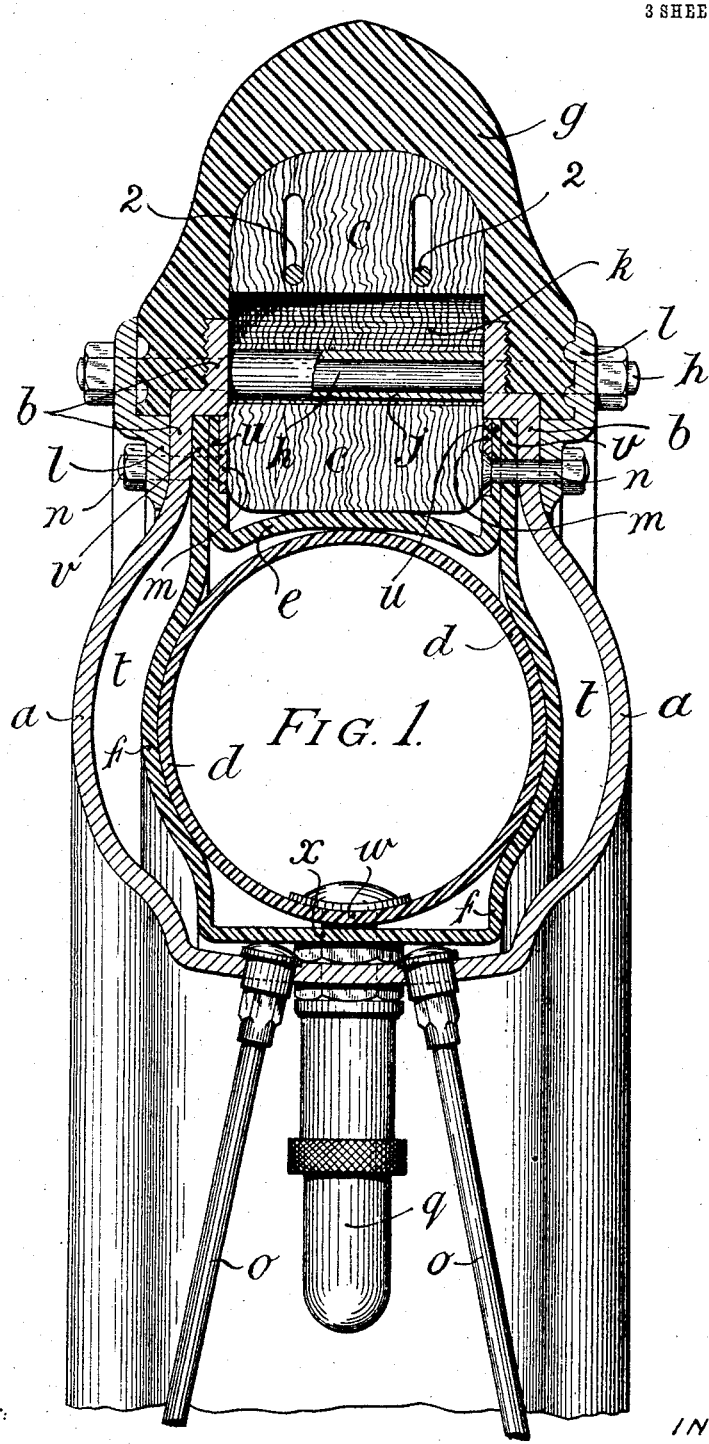
Figure 2:
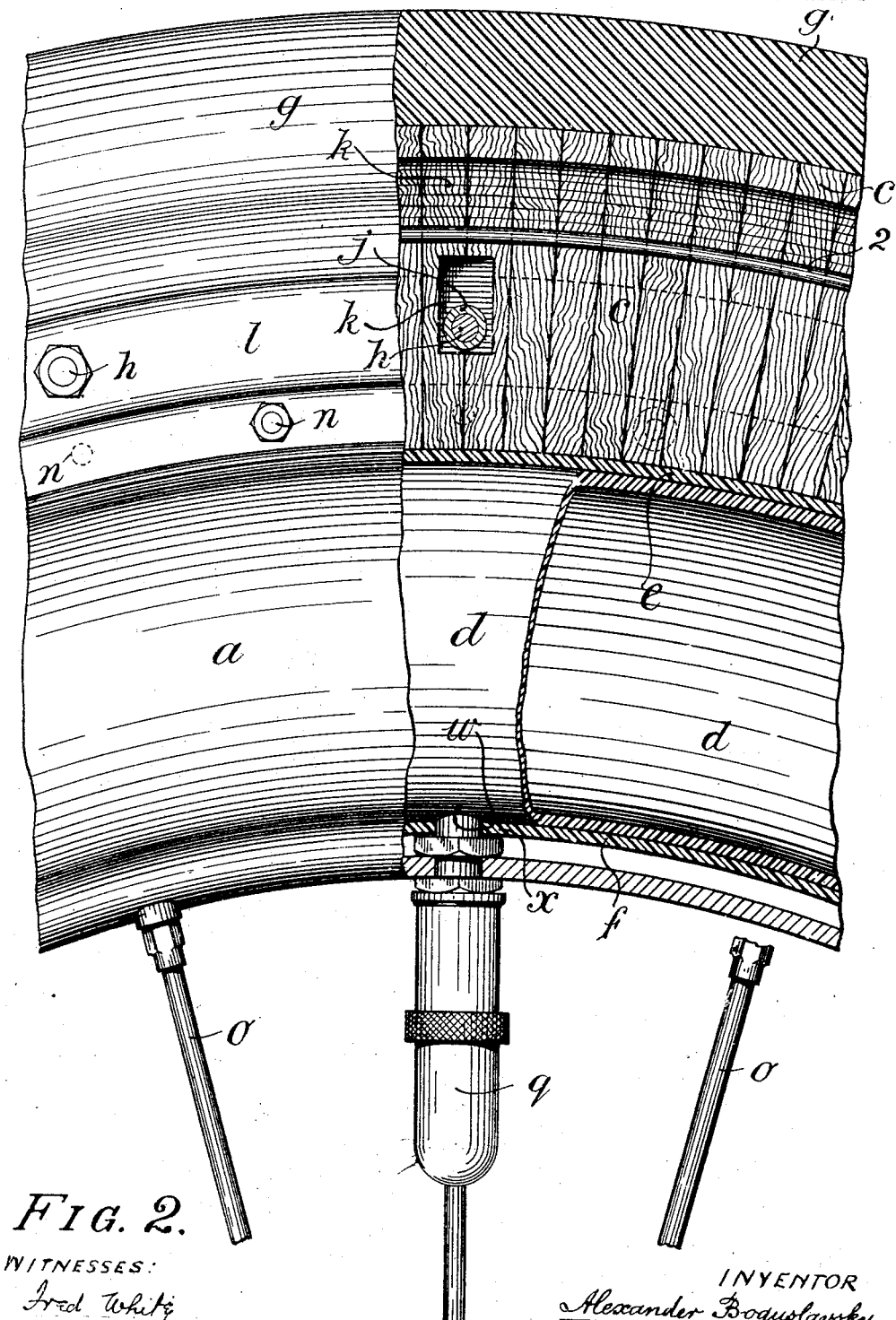
Figure 3:
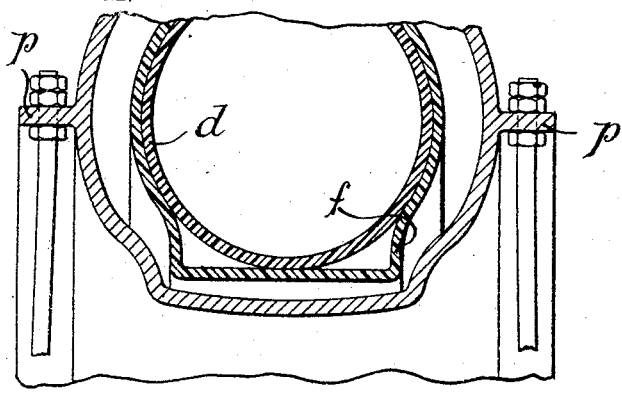
Figure 5:
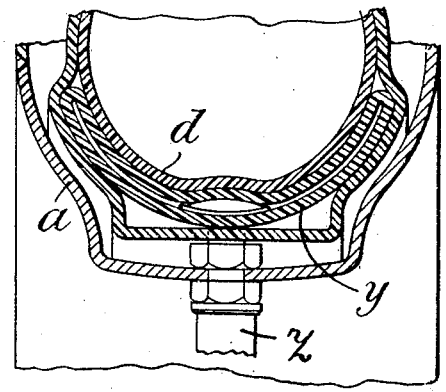
Figure 4:
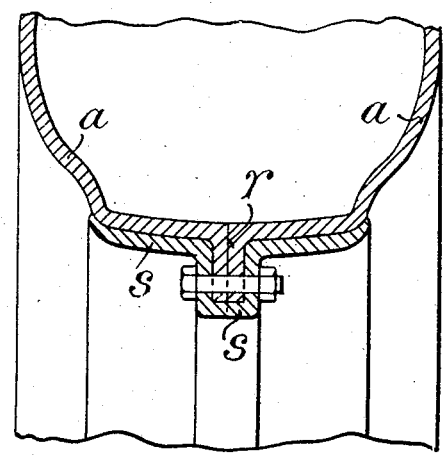
Figure 6:
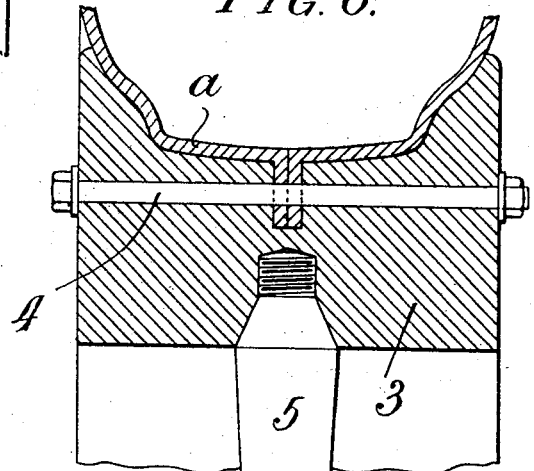

Referring to the drawings, Figure 1 is a cross-section of one form of wheel made in accordance with my invention. Fig. 2 is a part side elevation, partly in section, showing a portion of the battens or strips of wood exposed. Fig. 3 is a part sectional elevation showing another method of fixing the spokes. Fig. 4 is a section showing a rim made in two sections and bolted together. Fig. 5 is a section showing a spare pneumatic tube. Fig. 6 is a cross-section of a modified form showing the iron rim mounted on a wooden felly and suitable for artillery-wheels.

$a$ is the rim, which is preferably bulb shape and having flanges $b\ b$. Between the flanges is disposed a series of thin staves or battens $c$, having their ends rounded, the said staves or battens projecting beyond the rim in one direction—that is, away from the hub. In the bulbous portion of the rim is disposed a cushion or tube $d$, adapted to be inflated with air. Within the rim $a$ are annular bands $e$ and $f$, of rubber or other material, U-shaped in cross-section. One, $e$, is disposed between the cushion $d$ and the staves $c$ and the other, $f$, between the cushion $d$ and the rim $a$.

$g$ is an annular band of rubber or other material disposed over the strips $c$.

The said bands $e$, $f$, and $g$ are attached to the flanges $b$.

The flanges $b$ of the rim are stayed by bolts $h$ and distance-pieces $j$, and for this purpose some of the staves are slotted, as at $k$, to allow the passage of the bolts $h$ and distance-pieces $j$ and the free play of the said staves. The band $g$ is or may be held to the rim by an annular flange or cheek $l$, disposed on each side of the rim, the bolts $h$ being passed through the flanges $l$, outer cover $g$, and the part $b$ of the rim and the whole tightened up together by nuts or other suitable means.

$m\ m$ are internal clamping and guiding rings disposed in the rim. They serve both to clamp the edges of the U-bands $e$ and $f$ against the interior faces of the rim and as guides for the battens $c$ in their radial sliding motion.

$n$ represents bolts passed through the cheeks $l$, rim $a$, U-bands $e$ and $f$, and rings $m$ and tightened up by nuts, as shown.

The spokes $o$ may be either tension or compression spokes and may be secured to the rim in any well-known manner or secured to flanges $p$, formed on the rim $a$, as seen in Fig. 3.

A valve $q$ is placed through the rim $a$ to inflate the tube $d$.

In operation when the wheel rotates the battens $c$ adjacent to the ground are caused to slide inward and to press inward against the band $e$ and cushion $d$. The battens $c$ return to their normal positions as they leave the ground in consequence of the resiliency of the band $e$ and the tube $d$. Should the tube $d$ burst, the air would be held in the space inclosed by the bands $e$ and $f$, which space could be further inflated by the valve $q$, the air passing through the burst in the tube $d$. The bands $e$ and $f$ then practically form a substitute for the tube $d$, and should the air escape from the space inclosed by the bands $e$ and $f$ the inward pressure on the battens is taken up by the band $e$.

In some cases the battens $c$ may be dispensed with and fellies or tires, of wood or other material, may be used in their place. In some cases the band $f$ may be dispened with, in which case the battens $c$ would be held in position by the band $e$ should the cushion $d$ burst. In some cases the rim $a$ may be made in two pieces, which when bolted together form one complete rim, as shown at $r$, Fig. 4. If desired, a two-part rim of this character may be strengthened by means of a supplementary rim $s$, as shown in the figure.

The outer covering or band $g$ may be secured to the rim in any well known or suitable way, and the method of fixing the bands $e$ and $f$ may be varied. There is preferably a space $t$ between the rim $a$ and the band $f$ to give room for the lateral displacement of the tube $d$ when under pressure. The portions of the bands $e$ and $f$ and the tube $d$ marked $u\ v\ w\ x$ are preferably vulcanized. In some cases I may employ a spare tube $y$, as shown in Fig. 5, which could be inflated through a spare valve $z$ suitably disposed.

I may, if desired, connect the battens, staves, or sliding members by means of one or more wires or equivalent flexible devices passed through elongated holes in the same with the object of facilitating the introduction and removal of said battens or members. Two such wires are shown in the drawings at 2.

In Fig. 6 the metal rim is made in two parts and mounted on a wooden felly 3 and clamped in position by bolts 4. The spokes 5 may be mounted in any suitable manner.

What I claim as my invention, and desire to secure by Letters Patent, is—

1. A vehicle-wheel comprising a series of radial members disposed in the rim or felly adapted to slide radially therein and project therefrom, a pneumatic cushion disposed at the interior side of the inner ends of said radial members, and resilient material secured to the rim or felly between the radial members and pneumatic cushion, whereby when the radial members come in contact with the ground in the travel of the wheel they are forced inward against the resilient material and pneumatic cushion and are projected radially outward when they leave the ground.

2. A vehicle-wheel comprising a series of radial members disposed in the rim or felly adapted to slide radially therein and project therefrom, a pneumatic cushion disposed at the interior side of the inner ends of said radial members, and resilient material secured to the rim or felly between the radial members and pneumatic cushion, whereby when the radial members come in contact with the ground in the travel of the wheel they are forced inward against the resilient material and pneumatic cushion and are projected radially outward when they leave the ground, and an outer cover over said radial members and secured to the rim substantially as described.

3. A vehicle-wheel comprising a series of radial members disposed in the rim or felly adapted to slide radially therein and project therefrom, a pneumatic cushion disposed at the interior side of the inner ends of said radial members, and resilient material secured to the rim or felly between the radial members and pneumatic cushion, whereby when the radial members come in contact with the ground in the travel of the wheel they are forced inward against the resilient material and pneumatic cushion and are projected radially outward when they leave the ground, external flanges on the sides of the rim and spokes connecting the said flanges with the hub, substantially as specified.

4. A vehicle-wheel comprising a rim of bulbous channel-section, a series of radial members adapted to slide radially therein and projecting therefrom, a pneumatic tube disposed in the bulbous portion of the rim, a band of resilient material secured to the rim or felly, and disposed between the pneumatic members and the cushion whereby when the radial members come in contact with the ground in the travel of the wheel, they are forced inward against the resilient material and pneumatic cushion, and are projected radially outward when they leave the ground.

5. A vehicle-wheel comprising a series of radial members disposed in the rim or felly adapted to slide radially therein and project therefrom, a pneumatic cushion disposed at the interior side of the inner ends of said radial members, and resilient material secured to the rim or felly between the radial members and pneumatic cushion, whereby when the radial members come in contact with the ground in the travel of the wheel they are forced inward against the resilient material and pneumatic cushion and are projected radially outward when they leave the ground, slots in said radial members and a wire or wires or equivalent lacing passed through said slots whereby the radial members are connected together while free to slide radially, substantially as specified.

6. A vehicle-wheel comprising a rim of channel-section, a series of radial members adapted to slide radially therein and projecting therefrom, a band of resilient material secured in said rim, and adapted to receive the thrust of said radial members when same are forced inward, a second band of material secured in said rim, extending farther into same than the first band and in conjunction with the first band forming between said bands of material an inclosing chamber, and a pneumatic tube disposed in said chamber, substantially as specified.

7. A vehicle-wheel comprising a rim of channel-section, a series of radial members adapted to slide radially therein and projecting therefrom, a band of resilient material secured in said rim, and adapted to receive the thrust of said radial members when same are forced inward, a second band of material secured in said rim, extending farther into same than the first band and in conjunction with the first band forming between said bands of material an inclosing chamber, and a pneumatic tube disposed in said chamber, slots in said radial members and a wire or wires or equivalent lacing passed through said slots in such manner that the radial members are connected together while free to slide radially, substantially as specified.

8. A vehicle-wheel comprising a rim of channel-section, a series of radial members adapted to slide radially therein and projecting therefrom, a band of resilient material secured in said rim and adapted to receive the thrust of said radial members when same are forced inward, a second band of material secured in said rim extending farther into same than the first band and in conjunction with the first band forming an inclosing chamber, a pneumatic tube disposed in said chamber between said bands of material, stay-bolts passed through the rim and distance-pieces disposed in the rim, substantially as specified.

9. A vehicle-wheel comprising a rim of channel-section, a series of wood battens disposed therein in the cross-sectional plane thereof, having rounded outer ends and being adapted to slide radially in the rim and projecting therefrom, a band of resilient material disposed and secured in the rim and adapted to receive the thrust of said battens when same are forced inward, a second band of material secured in the rim extending farther into same than the first band and in conjunction with the first band forming an inclosing chamber, a pneumatic tube disposed in said chamber between said bands of material and an outer cover secured over said battens, substantially as specified.

10. A vehicle-wheel comprising a rim of channel-section, a series of wood battens disposed therein in the cross-sectional plane thereof, adapted to slide radially therein and projecting therefrom, a band of resilient material secured in said rim and adapted to receive the thrust of said battens when same are forced inward, a pneumatic tube disposed between said band of material and the back of the rim and an outer cover secured over said battens substantially as specified.

11. A vehicle-wheel comprising a rim of channel-section a series of radial members adapted to slide radially therein and projecting therefrom, a band of resilient material secured in said rim and adapted to receive the thrust of said radial members when same are forced inward, a second band of material secured in the rim, extending farther into same than the first band and in conjunction with the first band forming an inclosing chamber, a pneumatic tube disposed in said chamber between the two bands of resilient material, and an outer cover secured over said radial members, substantially as specified.

12. A vehicle-wheel comprising a rim, a series of radial members adapted to slide radially therein and projecting therefrom, a band of resilient material secured in said rim and adapted to receive the thrust of said radial members when same are forced inward, a second band of material secured in said rim, extending farther into same than the first band and in conjunction with the first band forming an inclosing chamber, a pneumatic tube disposed in said chamber between the two bands of material, the rim being of bulbous section so that space is provided at the sides of the second band of material for lateral displacement of the pneumatic tube and said second band, stay-bolts passed through the rim, distance-pieces disposed into the rim and an outer cover secured over the radial sliding members, substantially as specified.

13. A vehicle-wheel comprising a rim of channel-section, a series of radial members adapted to slide radially therein and projecting therefrom, a U-shaped band of resilient material in said rim and adapted to receive the thrust of said radial members when same are forced inward, a second U-shaped band of material in said rim, extending farther into same than the first band and in conjunction with the first band forming an inclosing chamber, a pneumatic tube disposed in said chamber, an outer cover disposed over said radial sliding members, annular clamping-cheeks disposed on each side of the rim and adapted to grip the edges of the outer cover against the rim, bolts passed through said cheeks, and the rim and nuts screwing thereon to grip the edges of the outer cover between said cheeks and the rim, distance-pieces on said bolts, annular clamping and guiding members in the rim, adapted to clamp the ends of the U-bands against the inner face of the rim and guide the radial members in their sliding motion, bolts passed through the rim, U-bands and clamping and guiding members and nuts screwing on said bolts to grip the U-bands between said members and the rim, substantially as specified.

14. A vehicle-wheel comprising a rim of channel-section, a series of radial members adapted to slide radially therein and projecting therefrom, a U-shaped band of resilient material in said rim and adapted to receive the thrust of said radial members when same are forced inward, a second U-shaped band of material in said rim extending farther into same than the first band and in conjunction with the first band forming an inclosing chamber, a pneumatic tube disposed in said chamber, an outer cover disposed over said radial sliding members, annular clamping-cheeks disposed on each side of the rim and adapted to grip the edges of the outer cover against the rim, bolts passed through said cheeks and the rim and nuts screwing thereon to grip the edges of the outer cover between said cheeks and the rim, distance-pieces on said bolts, annular clamping and guiding members in the rim adapted to clamp the ends of the U-bands against the inner face of the rim and guide the radial members in their sliding motion, bolts passed through the rim, U-bands and clamping and guiding members and nuts screwing on said bolts to grip the U-bands between said members and the rim, external flanges on the sides of said rim and spokes connected to said flanges and the hub of the wheel substantially as described.

15. A vehicle-wheel comprising a rim, a series of radial members adapted to slide radially, a pneumatic cushion extending around said rim inwardly of said radial members and adapted to receive the thrust thereof, and a band of flexible material between said members and said cushion adapted to receive the thrust of said members, said band being supported upon said rim so as to resist such thrust when said cushion is deflated.

16. A vehicle-wheel comprising a rim, a series of radial members adapted to slide radially, and two pneumatic cushions, each adapted when inflated to receive the thrust of said members as they move inwardly, the one adapted to be normally inflated, and the other normally deflated, and the latter adapted to be inflated when the first is deflated.

17. A vehicle-wheel comprising a rim, a series of radial members adapted to slide radially, and two pneumatic cushions, one within the other, and each adapted when inflated to receive the thrust of said radial members as they move inwardly.

In testimony whereof I have hereunto signed my name in the presence of two subscribing witnesses.

ALEXANDER BOGUSLAVSKY.

Witnesses:
    REGMATO EATON ELLIS,
    GORDON MELVILLE CLARK.